(12) United States Patent
Zhang

(10) Patent No.: US 10,613,495 B2
(45) Date of Patent: Apr. 7, 2020

(54) MOTOR DRIVE SYSTEM, MOTOR CONTROL SYSTEM, AND SELF-PROPELLED ROBOT

(71) Applicant: Nidec Corporation, Kyoto (JP)

(72) Inventor: Gang Zhang, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 11 days.

(21) Appl. No.: 16/194,478

(22) Filed: Nov. 19, 2018

(65) Prior Publication Data

US 2019/0086884 A1   Mar. 21, 2019

Related U.S. Application Data

(63) Continuation of application No. PCT/JP2017/007625, filed on Feb. 28, 2017.

(30) Foreign Application Priority Data

May 25, 2016   (JP) ................. 2016-104066

(51) Int. Cl.
*H02P 21/00*   (2016.01)
*G05B 15/02*   (2006.01)
*G06F 9/48*    (2006.01)
*G05B 11/01*   (2006.01)

(52) U.S. Cl.
CPC ............ *G05B 15/02* (2013.01); *G05B 11/011* (2013.01); *G06F 9/48* (2013.01); *G05D 2201/02* (2013.01)

(58) Field of Classification Search
CPC .................. G05B 2219/34434; G05B 15/02
See application file for complete search history.

(56) References Cited

U.S. PATENT DOCUMENTS

2006/0212137 A1* 9/2006 Sone .................. G06F 1/263
                                                700/22
2019/0064748 A1* 2/2019 Haneda ................ H03K 3/0315

FOREIGN PATENT DOCUMENTS

JP   10-161890 A   6/1998
JP   2002-199766 A 7/2002
JP   2002-272184 A 9/2002

OTHER PUBLICATIONS

Official Communication issued in International Patent Application No. PCT/JP2017/007625, dated May 30, 2017.

* cited by examiner

*Primary Examiner* — Karen Masih
(74) *Attorney, Agent, or Firm* — Keating & Bennett

(57) ABSTRACT

A processor of a motor drive system of the present disclosure executes the motor control software application in response to a first interrupt signal, and executes a task of the OS in response to a second interrupt signal. When the second interrupt signal is generated during execution of the motor control software application, the processor core sets the initial count value of the second timer to a value that would be reached, by counting, earlier by a count value than a second threshold, or a value that allows counting to be prolonged by the count value compared to the second threshold. The count value is greater than or equal to a difference between time at which the second interrupt signal is generated and time at which a process of the motor control software application is completed.

11 Claims, 14 Drawing Sheets

FIG.2

```
While(1){
  If (INTERRUPT OCCURS){
    CURRENT CONTROL ();
    if (INTERRUPT IS FIRST OF EVERY 10 INTERRUPTS GENERATED) {
      SPEED CONTROL ();
    }
    if (INTERRUPT IS FIRST OF EVERY 1000 INTERRUPTS GENERATED) {
      POSITION CONTROL ();
    }
  }
}
```

TIMER

PROCESSOR

PROCESSOR CORE

MOTOR DRIVE SYSTEM, MOTOR CONTROL SYSTEM, AND SELF-PROPELLED ROBOT

This is a continuation of International Application No. PCT/JP2017/007625, with an international filing date of Feb. 28, 2017, which claims priority of Japanese Patent Application No. 2016-104066, filed on May 25, 2016, the entire contents of which are hereby incorporated by reference.

BACKGROUND

1. Technical Field

The present disclosure relates to techniques of allowing a single signal processing circuit (processor) to adjust the timings of starting a plurality of tasks.

2. Description of the Related Art

Recent motor controllers, which have the function of controlling the rotation of a motor, are being provided with more other functions. Among such other functions is, for example, a communication function of allowing a motor controller to connect to the Internet or communicate with other devices. To this end, an operating system (OS) has been introduced to enable a user or application software to easily use the functions of the motor controller.

As an OS that is introduced into a motor drive system having a motor controller, a real-time OS is known. The real-time OS can execute real-time tasks, i.e., can manage processor time (CPU time) and handle calls at accurate times specified by a software process. The real-time OS operates according to interrupt signals from a system timer. Each time an interrupt signal occurs, the real-time OS detects an elapsed time, and allocates resources such as CPU time and memory space to a task, i.e., a process to be executed.

If time intervals at which a system timer generates an interrupt is reduced, the OS can more finely manage time. In that case, however, the number of OS calls per unit time increases. In general, each time a call occurs, saving data to a stack, restoring data from a stack, etc., need to be performed. Therefore, the introduction of the OS increases overhead. As a result, CPU time spent by the OS increases. The time interval of the system timer interruption cannot be infinitely reduced. At present, it is practical to set the time interval to 1 msec or more.

Likewise, control software is executed at regular times to control an object to be controlled. The time intervals at which control software is executed are called a control cycle. In most cases, the control cycle varies depending on the time constant of an object to be controlled. For example, control software applications for controlling the operation of a motor need to be executed at periodic intervals that are much shorter than 1 msec.

For example, Japanese Laid-Open Patent Publication No. 10-161890 describes a scheduler that allocates a predetermined execution time to a program. In the case where multiple programs are executed at predetermined periodic intervals, the sum of the execution times of the programs may exceed the length of the periodic interval, i.e., the periodic interval constraint may not be satisfied. In that case, the scheduler divides the process of a certain program into sub-processes, which are assigned to and executed over a plurality of periodic intervals. This allows execution of the multiple programs at the periodic intervals.

SUMMARY

The control software, which has a relatively short control cycle, and the OS, which executes tasks according to interrupts that are generated by a system timer at relatively long time intervals, are required to operate on the same processor. It is necessary to steadily execute the control software and the OS at their respective set periodic intervals.

The present disclosure provides a technique of periodically executing a motor control software application and an OS on the same processor.

In an illustrative motor drive system according to the present disclosure, when a second interrupt signal is generated during execution of a motor control software application, a processor core sets an initial count value of a second timer to a value that would be reached, by counting, earlier by a count value D than a second threshold, or sets the second threshold to a value that allows counting to be prolonged by the count value D compared to the second threshold. The count value D is greater than or equal to a count value corresponding to a difference between time Ta at which the second interrupt signal is generated and time Tb at which a process of the motor control software application is completed. A first timer and the second timer change their respective count values at the same periodic intervals according to a clock signal, or alternatively, one of the timers changes the count value at periodic intervals that are N times as long as those of the other timer (N: an integer of two or more). As a result, the timers can be adjusted such that interrupts do not interfere with each other, and the timing of starting a task can be adjusted. This allows the execution timing of a software application and the execution timing of an operating system to avoid coinciding and overlapping with each other.

An illustrative motor control system according to the present disclosure includes the above motor drive system, and a system controller to control drive of a motor of the motor drive system.

An illustrative self-propelled robot according to the present disclosure includes the above motor control system, a plurality of wheels, one or more of the plurality of wheels being driven by the motor, and a transfer table to place an object on.

According to an illustrative embodiment of the present invention, the execution timings of a motor control software application and a task of an operating system are adjusted, which allows the execution timings to avoid coinciding and overlapping with each other.

BRIEF DESCRIPTION OF THE DRAWINGS

FIG. 2 is a diagram showing a relationship of a process loop of a motor control software application.

DETAILED DESCRIPTION

A motor control software application and an operating system that are executed by a signal processing circuit (processor) of a motor controller will firstly be described with reference to FIGS. 1-3, and problems found by the present inventor will then be described with reference to FIG. 4. A motor control system according to the present disclosure will then be described with reference to FIG. 5 and following figures. In the description that follows, "operating system" is abbreviated to "OS."

Figure 1:
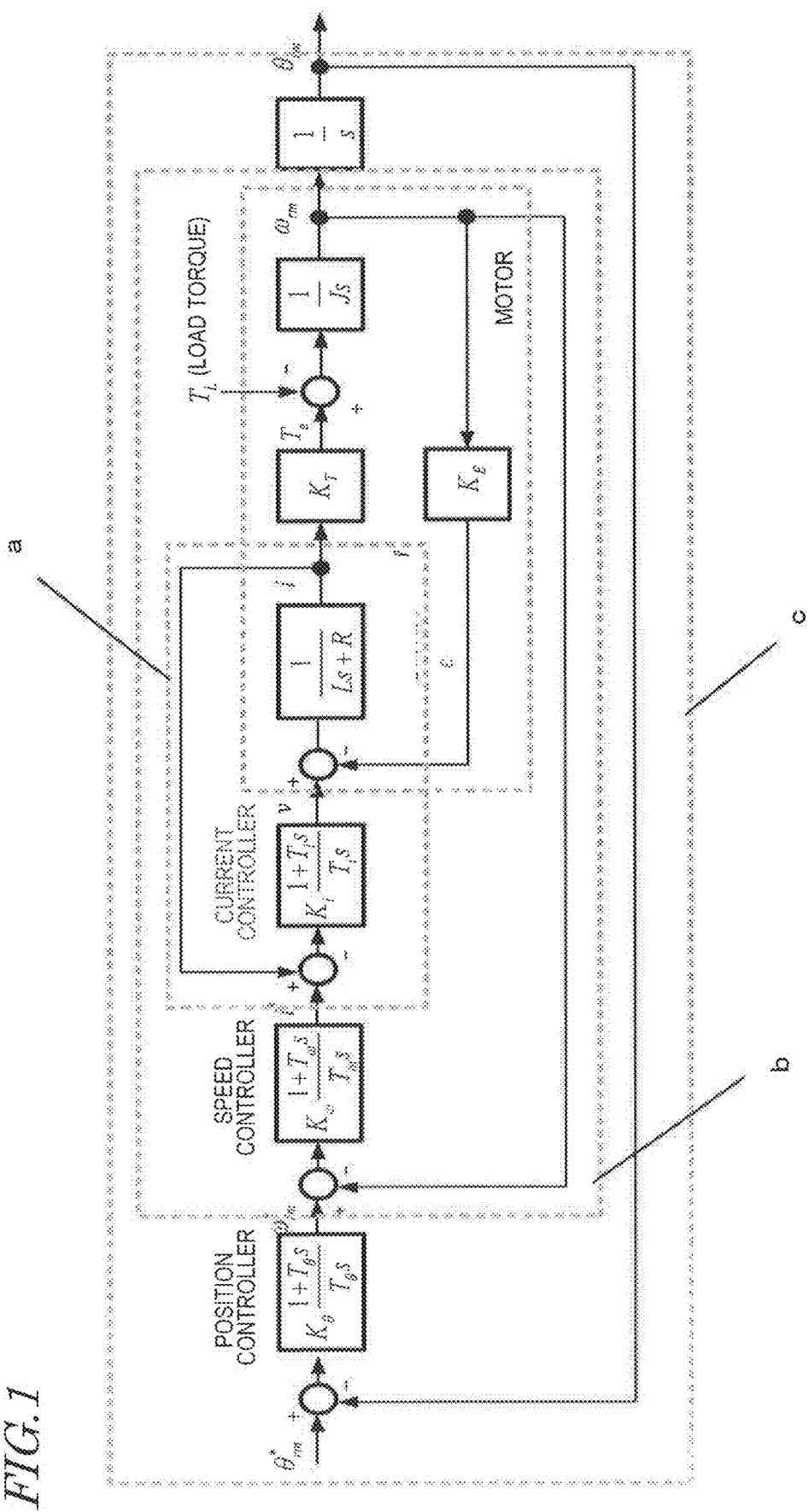
FIG. 1 is a diagram showing a loop structure involved with three types of control included in a feedback motor control model.

FIG. 1 shows a loop structure involved with three types of control included in a feedback motor control model. The motor control software application, which is designed according to this model, causes the processor to mainly execute a normal current control process a, a speed control process b, and a position control process c. The three control processes can be executed at different control cycles. Note that the processes a-c will not be specifically described.

The control cycles of the current control process a and the speed control process b are each determined based on the inductance and rotational inertia of a motor. The current control process a and the speed control process b may each be required to be executed at control cycles of less than 1 msec, e.g., 50 nanosec.

Needless to say, the OS, which manages time at intervals of 1 msec or more, cannot manage a motor control software application, which requires a control cycle of less than 1 msec. Therefore, for example, it may be contemplated that a hardware timer as a peripheral for the processor is used to generate an interrupt signal at time intervals of less than 1 msec, and the motor control software application is executed on the processor according to the interrupt signal.

FIG. 2 shows a relationship of a process loop of the motor control software application. It is assumed that the hardware timer generates an interrupt signal at time intervals of 50 nanosec. In response to reception of each interrupt signal, the motor control software application causes the processor to execute the current control process a. The processor executes speed control every 10 times an interrupt signal is generated, and position control every 1,000 times. As a result, the current control process a is executed every 50 nanosec, and the speed control process b is executed every 500 nanosec. The current control process a and the speed control process b are executed at time intervals of less than 1 msec.

Meanwhile, for the real-time OS that is executed on the same processor, an interrupt signal is generated every 1 msec using a different timer, such as a system timer. As a result, various software applications that require a control cycle of 1 msec or more can be executed as tasks under the control of the real-time OS.

Figure 3:
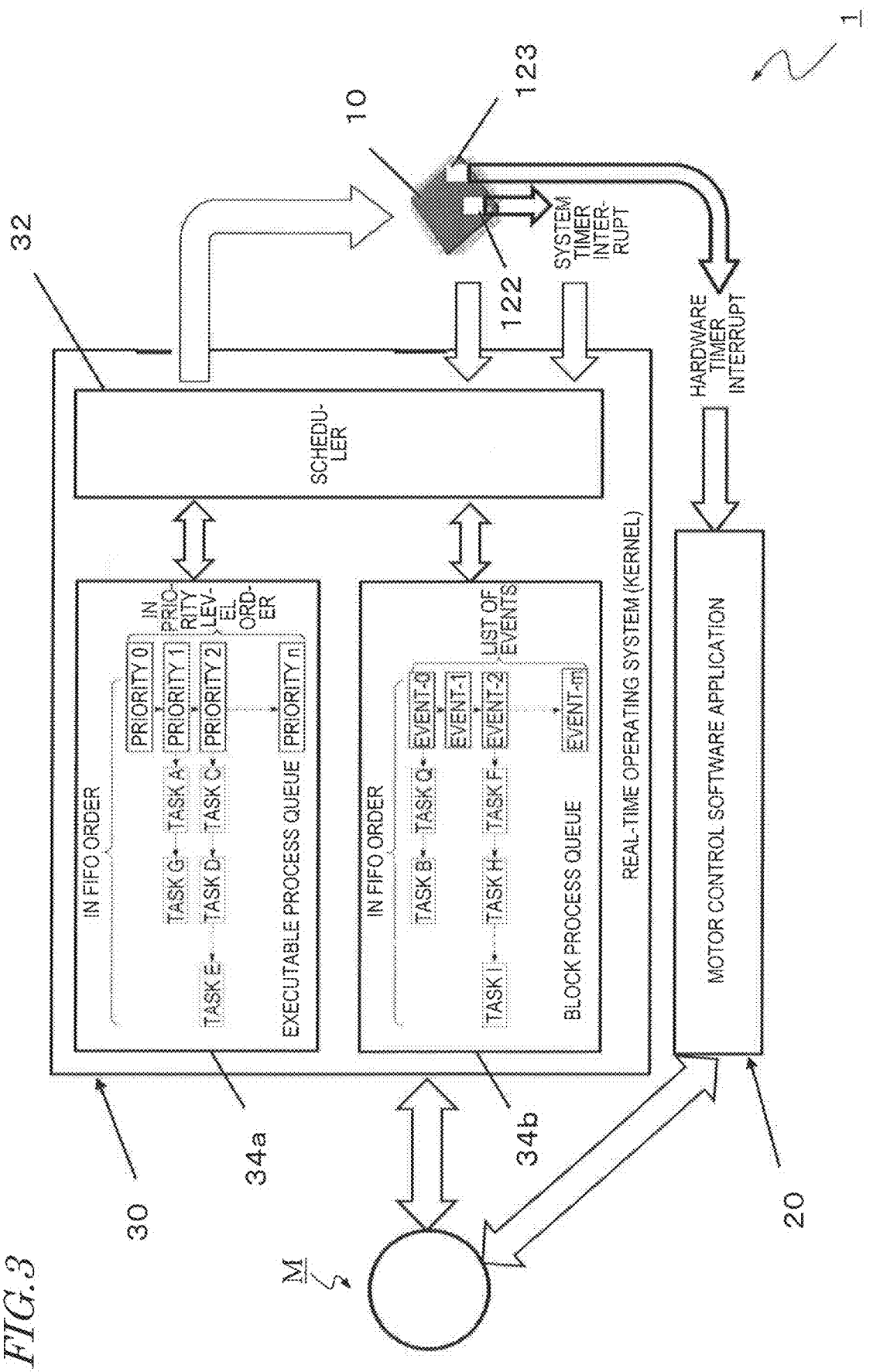
FIG. 3 is a diagram showing a structure of a motor drive system 1.

FIG. 3 shows a configuration of a motor drive system 1.

The motor drive system 1 has a processor 10 and a motor M. The rotation of the motor M is controlled by a motor control software application 20 and tasks of a real-time OS 30 being executed by the processor 10.

FIG. 3 shows both the processor 10 and the motor M as hardware, and the motor control software application 20 and the real-time OS 30 as software (computer programs), for ease of understanding. The motor control software application 20 and the real-time OS 30 are both merely a computer program, and the processor 10 is an actual main entity that executes processes. In fact, however, each computer program and the processor 10 cooperate with each other to operate as an apparent single specific device, and thereby implement functions provided by that program. Therefore, the computer programs may each herein be described as a main entity that performs an operation. For example, the description may include "the motor control software application 20 controls a motor," "the real-time OS 30 causes the processor 10 to execute various instructions," etc. As used herein, the term "computer program" is not limited to the motor control software application 20 and the real-time OS 30, and encompasses a "task" that is a program (process) that is managed and executed by each software application.

The processor 10 has a plurality of timers. FIG. 3 shows two timers, i.e., a system timer 122 and a hardware timer 123.

The system timer 122 and the hardware timer 123 each independently operate. Each timer has a timer counter, and increments or decrements the timer counter when receiving a clock signal. When the timer counter value reaches a predetermined value, the timer counter overflows or underflows, so that the timer outputs an interrupt signal.

In the present disclosure, it is assumed that the system timer 122 outputs an interrupt signal every 1 msec, and the hardware timer 123 outputs an interrupt signal every 50 μsec.

The motor control software application 20 is executed according to an interrupt signal from the hardware timer 123. As described above with reference to FIG. 1, the motor control software application 20 includes the current control process a, the speed control process b, and the position control process c. In the present disclosure, at least the current control process a is executed every 50 μsec.

The real-time OS 30 is executed according to an interrupt signal from the system timer 122. The real-time OS 30 manages a scheduler 32 and two queues 34a and 34b.

The scheduler 32 assigns a process (task) operable on the real-time OS 30 to an executable process queue 34a, a block process queue 34b, or the processor. The scheduler 32 receives an interrupt signal from the system timer, and each time it occurs, determines which of the tasks managed by itself is to be executed by the processor 10. As a result of the determination, the scheduler 32 causes the processor 10 to execute, for example, an executable task having the highest priority. The scheduler 32 also causes the processor 10 to execute a predetermined task, in response to a signal indicating interruption of an event-waiting process from the processor 10.

In the present disclosure, any task is executed every 1 msec under the control of the scheduler 32 of the real-time OS 30.

Next, problems with the operation of the motor drive system 1 that have been found by the present inventor will be described with reference to FIG. 4. Note that in the description that follows, it is assumed that the system timer 122 and the hardware timer 123 each generate an interrupt signal when the timer counter overflows. Note that in the foregoing example, it is assumed that the system timer 122 overflows every 1 msec, and the hardware timer 123 overflows every 50 μsec, for example. In other words, in the foregoing example, it is assumed that the hardware timer 123 overflows 20 times as quickly as the system timer 122. However, for the sake of simplicity of the drawings, it is hereinafter assumed that the hardware timer 123 overflows twice as quickly as the system timer 122.

Figure 4:
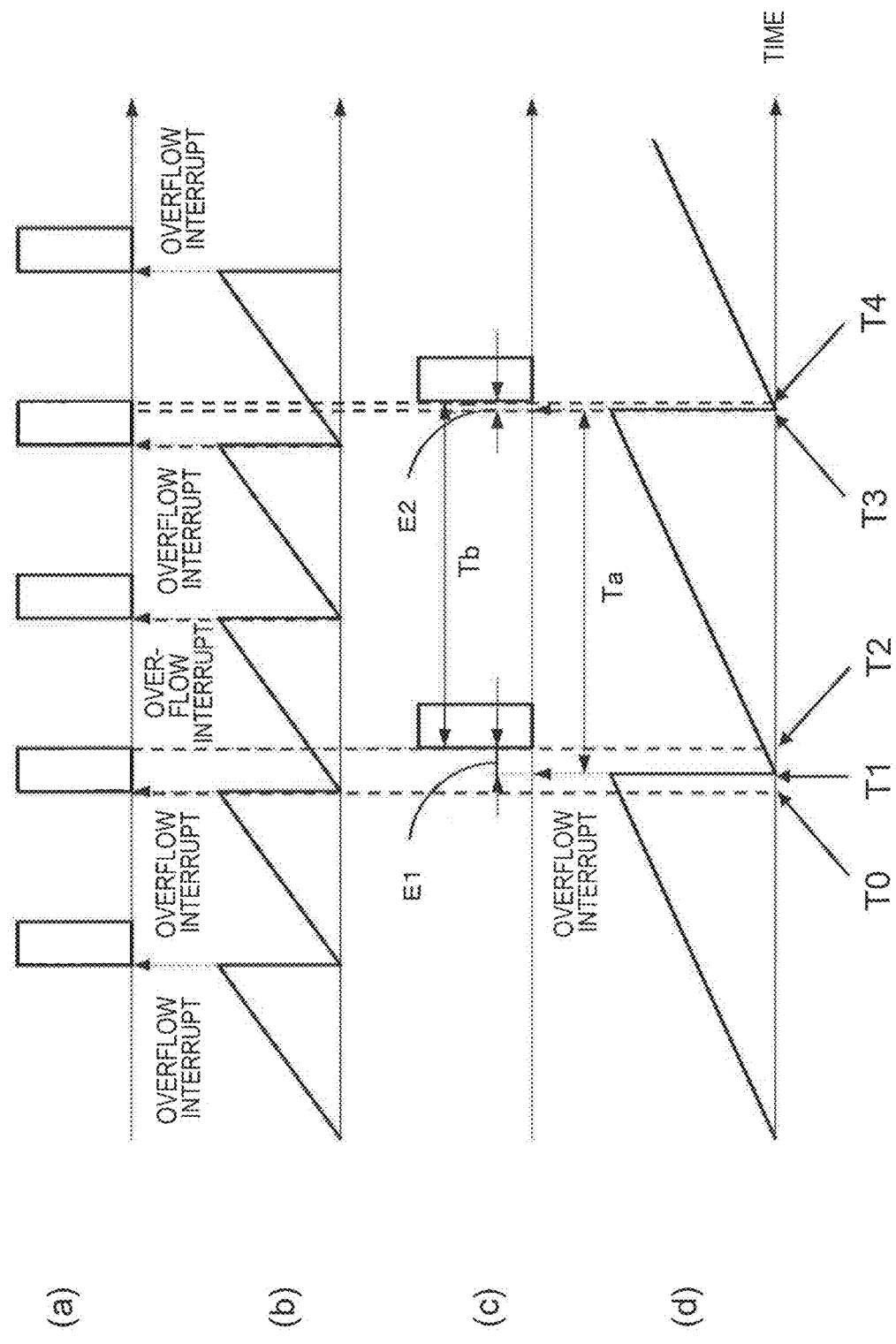
FIG. 4 is a diagram showing a situation that execution timings of a motor control software application 20 interfere with task execution timings of a real-time OS 30.

FIG. 4 shows a situation that execution timings of the motor control software application 20 interfere with task execution timings of the real-time OS 30. FIGS. 4(a) and 4(b) show timings involved with the operation of the motor control software application 20. FIGS. 4(c) and 4(d) show timings involved with the operation of the real-time OS 30.

The system timer 122 (FIG. 4(d)) and the hardware timer 123 (FIG. 4(b)) output an interrupt signal at different periodic intervals. Therefore, some interrupt signals of the system timer 122 and the hardware timer 123 occur at the same timing or close timings. The term "close" means that before a task triggered by a preceding interrupt signal is completed, a succeeding interrupt signal occurs. FIG. 4 shows a situation that certain interrupt signals of the two timers occur at close timings.

Concerning the motor control software application 20, at time T0 that the count value of the hardware timer 123 of FIG. 4(b) overflows, the hardware timer 123 outputs an interrupt signal. As a result, the processor 10 executes a process of the motor control software application 20 from time T0. The process is continued until time T2. For a time period from time T0 to time T2, the processor 10 is occupied with the process of the motor control software application 20.

Meanwhile, concerning the real-time OS 30, at time T1 that the count value of the system timer 122 of FIG. 4(d) overflows, the system timer 122 outputs an interrupt signal. However, as shown in 4(d), time T1 is included in the time period from time T0 to time T2. The processor 10 cannot execute a task of the real-time OS 30.

Therefore, the execution of a task of the real-time OS 30 is not immediately performed and is delayed until time T2, i.e., is started from time T2. A task that should originally be executed from time T1 is actually executed from time T2, i.e., the start of execution of the task is delayed by a time E1 that is (T2−T1). The delay time E1 is referred to as a "delay of start due to pre-emption." FIG. 4(c) also shows a delay time E2 due to pre-emption that is a period of time between time T3 and time T4.

As shown in FIG. 4(d), an overflow interrupt caused by the system timer 122 occurs at periodic intervals Ta. A task of the real-time OS 30 that should originally be executed at control cycles Ta is actually executed at control cycles Tb due to a delay of start due to pre-emption, i.e., the execution of a task at predetermined periodic intervals is impaired.

In general, a rule is employed that an interrupt signal having a relatively short control cycle is given a higher priority, and an interrupt signal having a relatively long control cycle is given a lower priority. In the case where this rule is applied to a system in which a motor control software application and a real-time system coexist, interruption of a timer for driving the real-time system is given a lower priority, and interruption of a timer for driving the motor control software application is given a higher priority. Therefore, in FIG. 4, when the motor control software application 20 is previously being executed, even if an interrupt signal from the system timer 122 occurs, a delay of start due to pre-emption occurs in a task of the real-time OS 30 because of its lower priority.

Note that in the case where the above rule is not applied, if a task of the real-time OS 30 is previously being executed, a delay of start due to pre-emption may occur in the motor control software application 20. In order to accurately control the motor M rotating at high speed, the control cycle of the motor control software application 20 is set relatively short. Therefore, if a delay of start due to pre-emption occurs, the operation of the motor drive system 1 may be affected. The degree of this influence is considered to be greater than that of the influence of a delay of start due to pre-emption occurring in the real-time OS 30.

The present inventor has arrived at the technique of the present disclosure that allows the motor control software application 20 and the real-time OS 30 to be each executed at preset control cycles. A configuration and operation of the present disclosure will now be described with reference to FIGS. 5-13.

Firstly, a specific configuration of the motor drive system 1 for implementing a process according to the present disclosure will be described with reference to FIGS. 5-7. A specific process of the processor 10 will then be described with reference to FIGS. 8-13.

Figure 5:
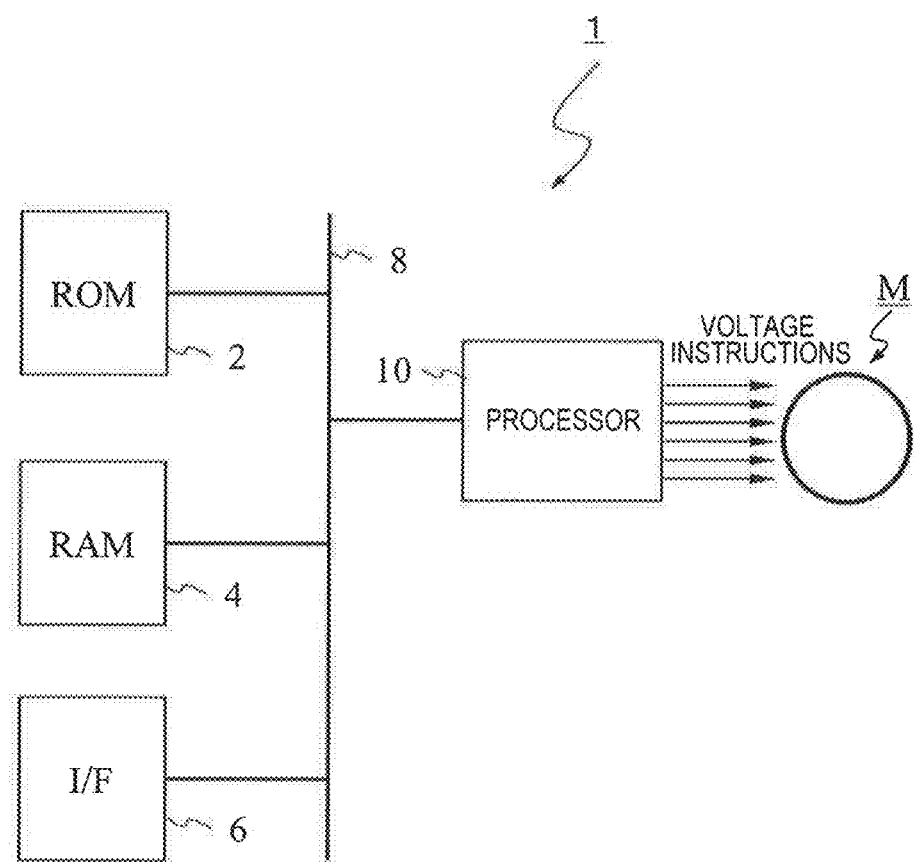
FIG. 5 is a diagram showing an example hardware configuration of the motor drive system 1 according to the present disclosure.

FIG. 5 is a diagram showing an example hardware configuration of the motor drive system 1 according to the present disclosure.

The motor drive system 1 has the motor M, and a read-only memory (ROM) 2, a random access memory (RAM) 4, an input/output interface (I/F) 6, and the processor 10, which are coupled together via a bus 11. Other circuits or devices (an A/D converter, etc.), which are not shown, may be additionally coupled to a bus 11.

The motor M includes, in addition to a motor itself, a motor drive circuit to drive the motor, for the sake of convenience. The motor M receives a PWM signal, and rotates according to the PWM signal.

The ROM 2 is a non-volatile memory storing data of the real-time OS 30. The ROM 2 may also store the motor control software application 20. Note that the motor control software application 20 may be stored in a program flash memory described below of the processor 10. The RAM 4 is a volatile memory that is used as a work memory.

The I/F 6, which is a data input/output terminal, is used when the motor drive system 1 exchanges data with an external device. The I/F 6 may be various connection terminals. The I/F 6 may be a communication terminal for sending data generated by a task of the real-time OS 30. Alternatively, in the case where the ROM 2 is rewritable, the I/F 6 may be a data input terminal for receiving a new version of the real-time OS 30. Alternatively, the I/F 6 may be a wireless communication circuit for performing wireless communication.

The processor 10 executes the real-time OS 30 stored in the RAM 4, or the motor control software application 20 stored in an SRAM in the processor 10.

When the motor drive system 1 is turned on, the processor 10 reads data of the real-time OS 30 from the ROM 2, and loads the data into the RAM 4. As a result, the processor 10 can execute the real-time OS 30. The processor 10 also reads the motor control software application 20 from the ROM 2, and loads the motor control software application 20 into the SRAM in the processor 10. As a result, the processor 10 can execute the motor control software application 20.

The processor 10 periodically executes the motor control software application 20 and a task of the real-time OS by executing a process described below of the present disclosure. The processor 10 sends a PWM signal generated by executing the motor control software application 20, to the motor M, to control the rotation of the motor M. The processor 10 also sends out data generated by operating the real-time OS 30 via the I/F 6.

The motor drive system 1 may be implemented by, for example, a 32-bit general-purpose microcontroller. Such a microcontroller may include one or more integrated circuit chips.

Next, an internal structure of the processor 10 will be described.

Figure 6:
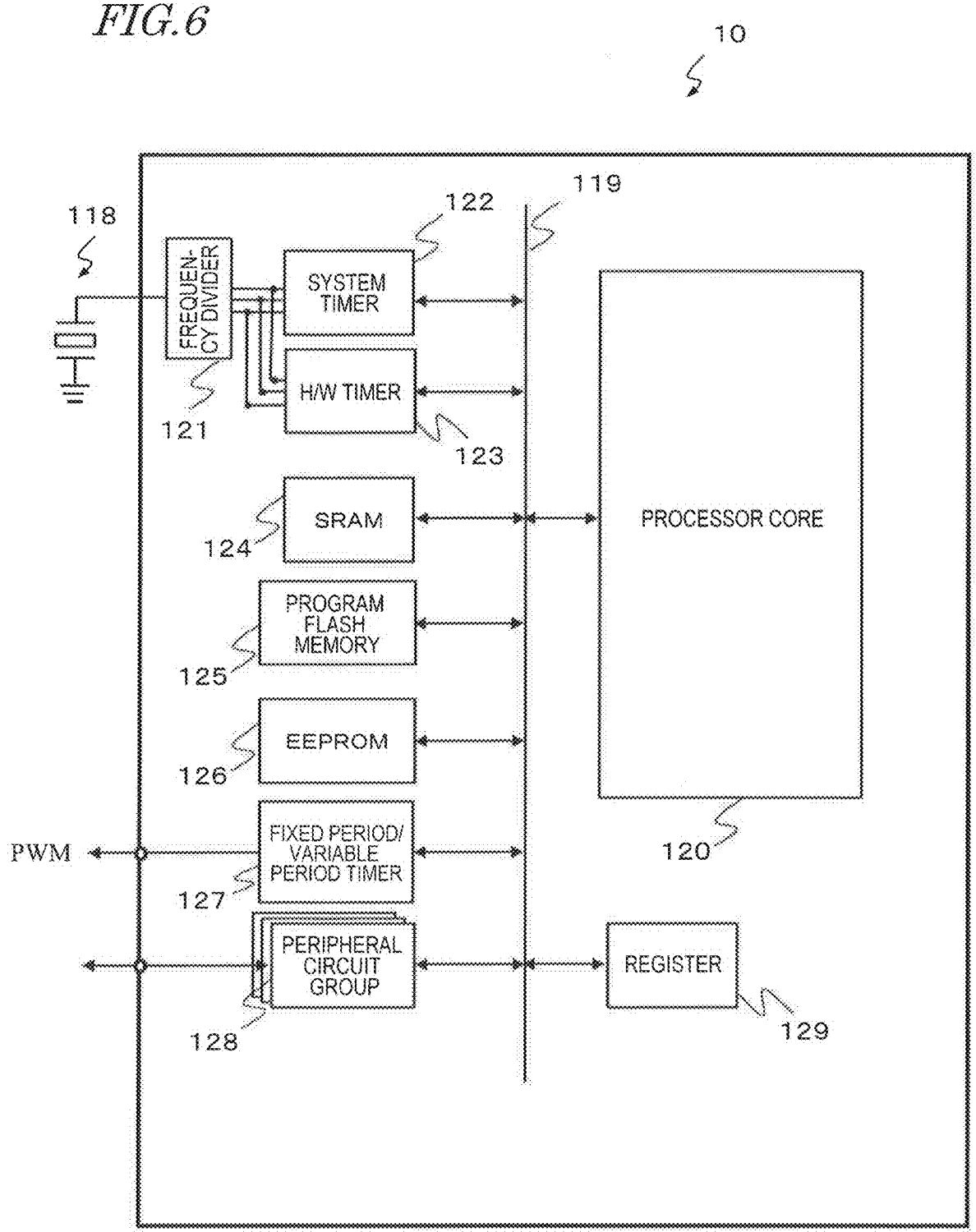
FIG. 6 is a diagram showing an internal structure of a processor 10.

FIG. 6 shows the internal structure of the processor 10.

The processor 10 includes a processor core 120, a frequency divider 121, the system timer 122, the hardware timer 12, an SRAM 124, a program flash memory 125, an EEPROM 126, a fixed period/variable period timer group 127, a peripheral circuit group 128, and a register 129, which are coupled together via an internal data bus 119.

The processor core 120 is a computation circuit that includes various sub-components. The processor core 120 includes, for example, a program counter, a command register, a command decoder, a stack pointer, a general-purpose register, and a timer interrupt control circuit. These are all commonly used and will not be described.

The frequency divider 121 receives an external clock signal from a crystal or silicon oscillator 118 that is provided outside the processor 10, divides the frequency of the external clock signal, and outputs a clock signal having a predetermined frequency.

The system timer 122 generates an internal clock signal having a predetermined frequency for operating the processor 10, according to the clock signal received from the frequency divider 121.

The system timer 122 and the hardware timer 123 each increment a timer counter (described below) using the clock signal received from the frequency divider 121, and when the counter value reaches a predetermined value, outputs an interrupt signal to the processor core 120. Note that the number of hardware timers is not particularly limited. A plurality of hardware timers may be provided. The timer counter may also be a decrement counter. In the present disclosure, it is assumed that the timer counter is an increment counter, for example.

Note that the processor core 120 can select what frequencies the clock signals input from the frequency divider 121 to the system timer 122 and the hardware timer 123 should have.

The SRAM 124 is a work memory for use in operation of the processor core 120, and stores data that is frequently rewritten.

The program flash memory 125 is a memory that stores a program and data that is less frequently rewritten.

The EEPROM 126 is a kind of non-volatile memory that can retain stored data even when power is shut off, and allows data to be electrically rewritten. Various preset values described below are stored in the EEPROM 126.

The fixed period/variable period timer group 127 is a circuit including a combination of a plurality of timers for generating a PWM signal. By combining a fixed period timer and a variable period timer, a pulse-width modulated signal can be generated.

The peripheral circuit group 128 is a group of circuits other than the above circuits. The peripheral circuit group 128 includes, for example, a high-precision analog circuit (an A/D converter, a D/A converter), a motor control circuit, a universal asynchronous receiver-transmitter (UART), which performs conversion between a serial signal and a parallel signal, and a communication interface device.

The register 129 stores data that specifies the priority of each of the system timer 122 and the hardware timer 123. In the present disclosure, the priority of the hardware timer 123 is set higher than the priority of the system timer 122. For example, in the case where a rule is employed that a priority having a smaller value is higher, the value of the priority of the hardware timer 123 is set smaller than the value of the priority of the system timer 122. An interrupt signal from a timer having a relatively higher priority is processed prior to an interrupt signal having a relatively lower priority. For example, even when the processor core 120 is executing a task of the real-time OS 30, then if the processor core 120 receives an interrupt signal from the hardware timer 123, the processor core 120 executes the motor control software application 20 with higher priority. In the present disclosure, the above priority may be referred to as an "interrupt priority."

In the present disclosure, even when an overflow interrupt is generated by the system timer 122 during a time period in which the processor core 120 is executing the motor control software application 20 in response to an overflow interrupt from the hardware timer 123, the processor core 120 does not execute an interrupt process of the system timer 122. Therefore, the execution of the real-time OS 30 is not immediately performed and is delayed.

Next, a configuration of the system timer 122 will be described.

Figure 7:
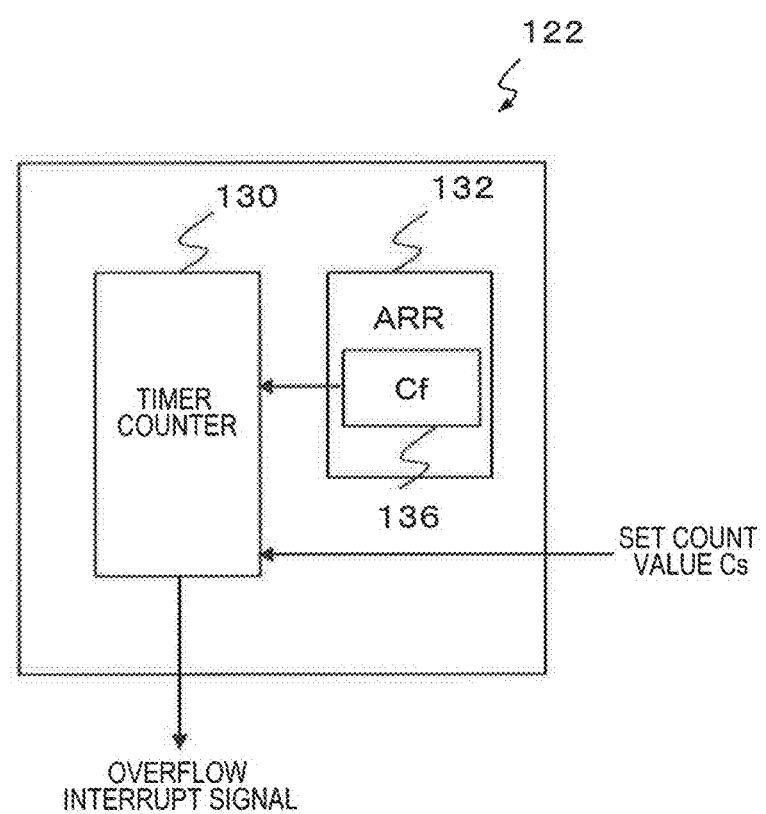
FIG. 7 is a diagram showing an internal configuration of a system timer 122.

FIG. 7 shows an internal configuration of the system timer 122.

The system timer 122 has a timer counter 130 and an auto-reload register (ARR) 132. The ARR 132 stores data 136 indicating an upper-limit count value Cf. The timer counter 130 increments the counter value, starting with an initial count value C0, according to a clock signal supplied from the frequency divider 121. When the counter value reaches the upper-limit count value Cf stored in the ARR 132, the timer counter 130 stops counting, and outputs, to the processor core 120, an overflow interrupt signal indicating the occurrence of overflow in the timer counter 130. Thereafter, the timer counter 130 resets the count value to the initial count value C0.

In the present disclosure, it takes 1 msec to reach the upper-limit count value Cf from the initial count value C0. Note that by changing the upper-limit count value Cf using a process described below to temporarily change the time until the occurrence of overflow, the timing at which overflow occurs subsequently can be shifted.

The oscillator 118 and the frequency divider 121 output a sufficiently accurate clock signal. The system timer 122 and the hardware timer 123, which receive the clock signal to increment the counter, also increment the counter sufficiently accurately, and cause overflow at periodic intervals P.

The timer counter 130 normally counts from the initial count value C0 to the upper-limit count value Cf. However, when receiving a set count value Cs from the processor core 120, the timer counter 130 starts counting from the set count value Cs. By setting the set count value Cs as appropriate, the time until the occurrence of overflow in the timer counter 130 can be adjusted.

In this embodiment, the timer counter 130 increments the counter, starting with the specified set count value Cs, and when the count value reaches the upper-limit count value Cf, resets the count value to the initial count value C0. Therefore, the timer counter 130 changes the value with which count begins, only when the set count value Cs is specified.

Note that the time until the occurrence of overflow of the timer counter 130 may be adjusted using other methods. Instead of changing the initial count value C0, the upper-limit count value Cf may be changed. When the upper-limit count value Cf is set smaller, the time until the occurrence of overflow of the timer counter 130 decreases. When the upper-limit count value Cf is set greater, the time until the occurrence of overflow of the timer counter 130 increases. After the upper-limit count value Cf has been changed, the changed upper-limit count value Cf may continue to be employed. Once the timer counter 130 has been reset, the changed upper-limit count value Cf may be set back to a predetermined value.

The hardware timer 123 (FIG. 6) may have the same configuration as that of the system timer 122 of FIG. 7. Note that the time it takes for the hardware timer 123 to reach the upper-limit count value Cf from the initial count value C0 is 500 μsec. The reason why the hardware timer 123 is twice as quick as the system timer 122 is that the timer counter 130 of the hardware timer 123 changes the count value by twice as great an amount per clock signal as that of the timer counter 130 of the system timer 122. As a result, even when the same clock signal and the same upper-limit count value are used, the hardware timer 123 can always generate an overflow interrupt signal at twice as high a rate as that of the system timer 122.

As can be seen from the foregoing, the processor core 120 can read the timer counter 130 of each of the system timer 122 and the hardware timer 123, and change the initial count value C0 and/or the upper-limit count value Cf of the timer counter 130.

Next, operations of the processor 10 of the present disclosure will be described with reference to FIGS. 8-11.

Figure 8:
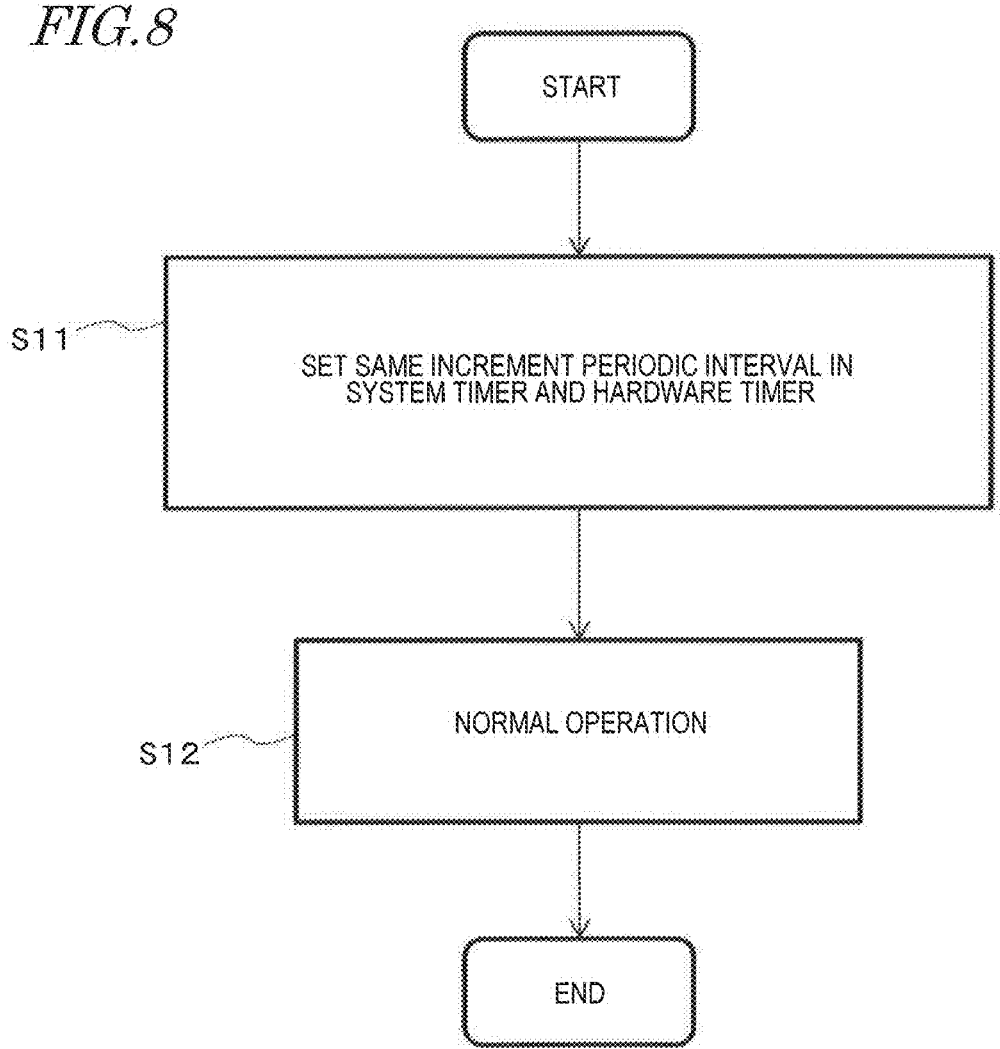
FIG. 8 is a flowchart showing steps involved in an initial operation of the processor 10.

FIG. 8 is a flowchart showing steps involved in an initial operation of the processor 10.

In step S11, the processor 10 sets the same periodic increment interval in the system timer and the hardware timer. Specifically, the processor core 120 of the processor 10 inputs a clock signal having the same frequency from the frequency divider 121 to the system timer 122 and the hardware timer 123. As a result, the system timer 122 and the hardware timer 123 increment at the same periodic intervals.

In step S12, the processor core 120 performs a normal operation. The normal operation refers to an operation that the processor core 120 executes while switching between the motor control software application 20 and the real-time OS 30 in response to an overflow interrupt signal from the system timer 122 and an overflow interrupt signal from the hardware timer 123.

The process of FIG. 8 triggers an operation of the motor drive system 1.

Figure 9:
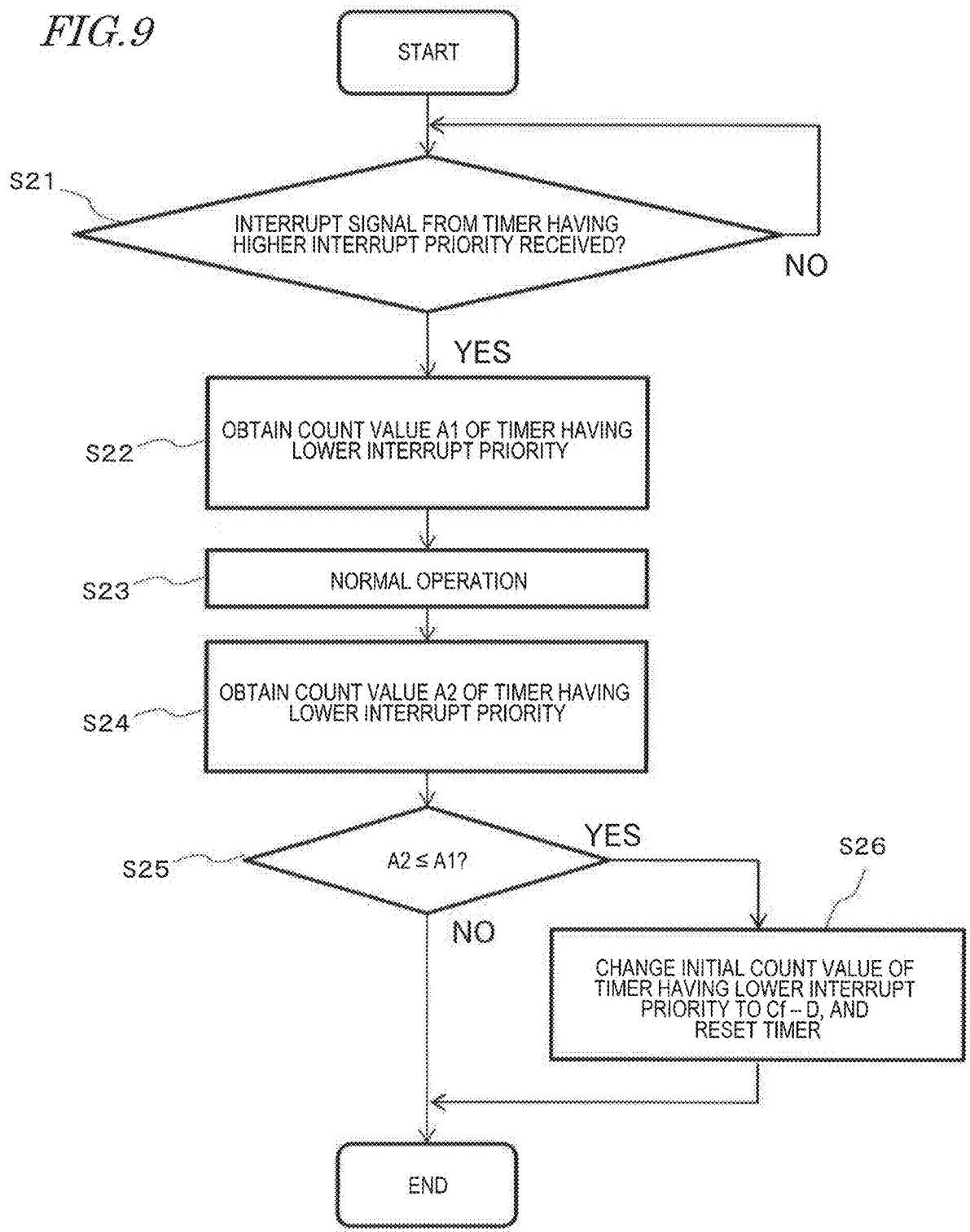
FIG. 9 is a flowchart showing steps involved in a task triggering timing adjustment process of the processor 10.
Figure 10:
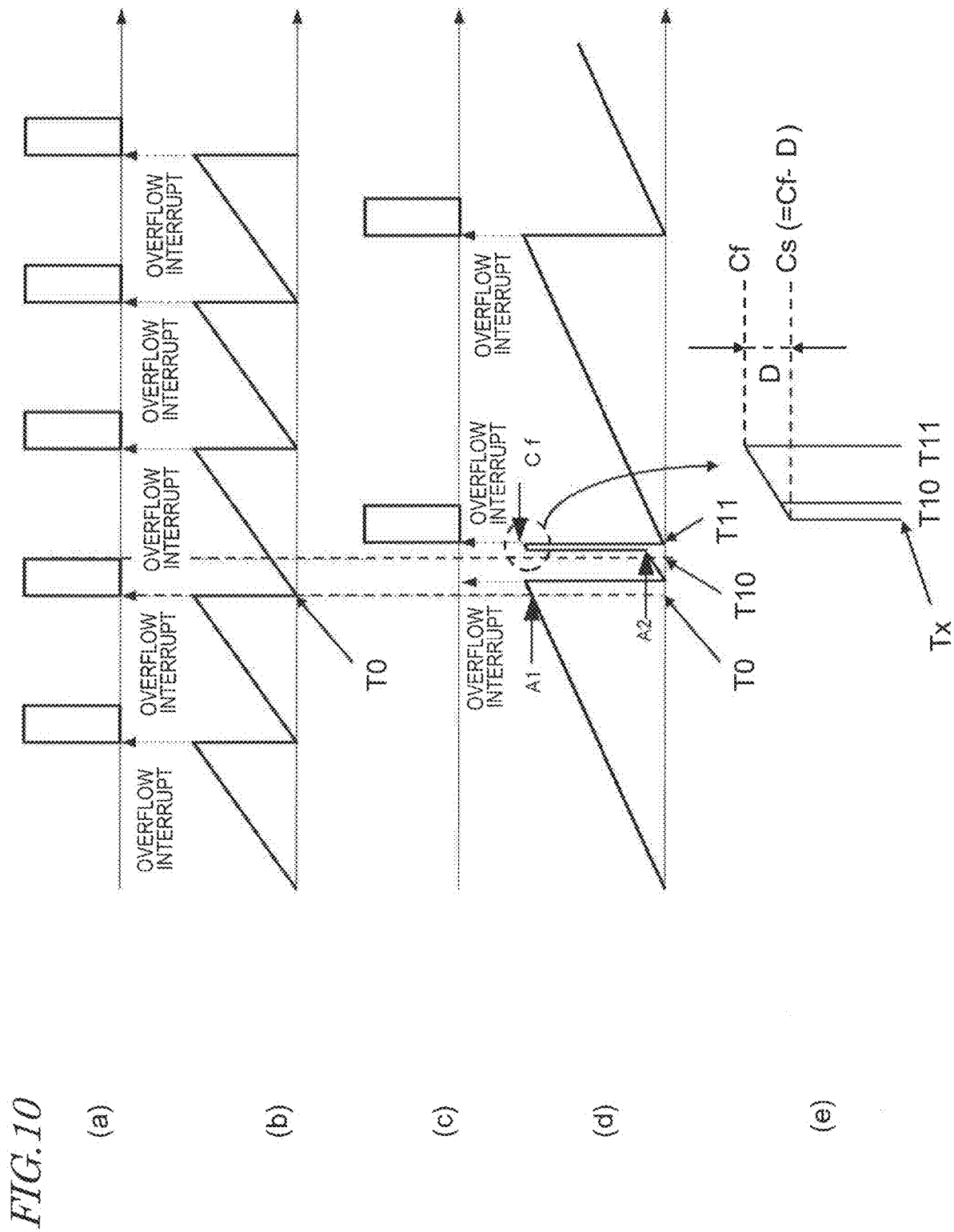
FIG. 10 is a diagram mainly showing changes in the counter value of the system timer 122 that occur when the process of FIG. 9 is executed.

Next, refer to FIGS. 9 and 10.

FIG. 9 is a flowchart showing steps involved in a task triggering timing adjustment process of the processor 10. The process of FIG. 9 is executed in parallel with the normal process after the start of FIG. 8. FIG. 10 mainly shows changes in the counter value of the system timer 122 that occur when the process of FIG. 9 is executed. FIGS. 10(a) and 10(b) show timings involved with an operation of the motor control software application 20 according to the hardware timer 123. FIGS. 10(c) and 10(d) show timings involved with an operation of the real-time OS 30 according to the system timer 122. FIG. 10(e) is a partially enlarged view of FIG. 10(d).

In step S21 of FIG. 9, the processor core 120 executes the normal process until the processor core 120 receives an interrupt signal from a timer having a higher interrupt priority. Here, the "timer having a higher interrupt priority" is the hardware timer 123. Note that interrupt priorities are previously set in the register 129 (FIG. 6). The processor core 120, when receiving an interrupt signal from the hardware timer 123, executes step S22 following step S21. As shown in FIG. 10(b), at time T0, the hardware timer 123 outputs an interrupt signal.

In step S22, the processor core 120 obtains a counter value A1 of a timer having a lower interrupt priority. Here, the "timer having a lower interrupt priority" is the system timer 122. The processor core 120 stores the obtained counter value A1 into the SRAM 124. As shown in FIG. 10(d), at time T0, the counter value A1 of the system timer 122 is obtained.

In step S23, the processor core 120 performs the normal operation. Specifically, the processor core 120 has received an interrupt signal from the hardware timer 123 (step S21), and therefore, executes the motor control software application 20 (FIG. 10(a)). After the execution of the motor control software application 20 has been completed, the processor core 120 executes the next step S24.

In step S24, the processor core 120 obtains a count value A2 of the timer having a lower interrupt priority. The processor core 120 stores the obtained counter value A2 into the SRAM 124. As shown in FIG. 10(d), at time T10, the counter value A2 of the system timer 122 is obtained.

In step S25, the processor core 120 determines whether or not the obtained counter values A1 and A2 satisfy A2≤A1. If A2≤A1, control proceeds to step S26. If A2>A1, control proceeds to end. The process of step S25 is intended to determine whether or not the system timer 122, having a lower interrupt priority, has overflown during the execution of the motor control software application 20. Because the counter of the system timer 122 is still incrementing the counter, when the value A2 obtained later is smaller than or equal to the value A1 obtained earlier, this means that the system timer 122 has overflown and then has once been reset. The execution of the determination process of step S26 allows the processor core 120 to know that the system timer 122 and the hardware timer 123 have generated interrupt signals at the same timing or at close timings.

Note that FIG. 10(d) shows an example case where A2≤A1 is satisfied. It should be understood that the system timer 122 outputs an overflow interrupt between time T0 and time T10.

In step S26, the processor core 120 changes the initial count value Cs of the system timer 122, having a lower interrupt priority, to a value (Cf−D) that is earlier by D than the upper-limit count value Cf, i.e., a value that would be reached, by counting, earlier by D than the upper-limit count value Cf, and resets the system timer 122. As a result, the system timer 122 starts counting from the initial count value Cf−D.

Here, the count value D is set such that an interrupt having a lower priority occurs immediately after the end of the process of the motor control software application 20, having a higher priority. More specifically, as shown in FIG. 10(*d*), the count value D is greater than or equal to a count value corresponding to the difference between time T11 at which an overflow occurs in the system timer 122 and an interrupt signal is generated, and time T10 at which the process of the motor control software application 20 is completed. If the count value D is set to (T11−T10), an interrupt having a lower priority is generated at the next count after the process of the motor control software application 20 having a higher priority. The count value D may be set greater than (T11−T10) in order to provide a certain margin. For example, the count value D may be set to a count value corresponding to a worst-case execution time of the motor control software application 20. FIG. 10(*e*) shows an example in which the count value D is set greater than (T11−T10). The system timer 122 is reset at time Tx before T10, and starts counting from the count value Cs (=Cf−D).

As described above, step S25 of FIG. 9 is a process applied to the system timer 122 which includes an increment counter. In the case where the system timer 122 includes a decrement counter, the relationship between the count value A1 obtained earlier and the count value A2 obtained later is replaced by A1≤A2. If A1≤A2 is satisfied, the processor core 120 detects that an underflow interrupt signal from the system timer 122 has been generated during the execution of the motor control software application 20.

Next, a variation will be described with reference to FIGS. 11 and 12. In the example of FIGS. 9 and 10, the initial count value of the timer counter 130 provided in the system timer 122 is changed. In this variation, the upper-limit count value of the timer counter 130 is changed.

Figure 11:
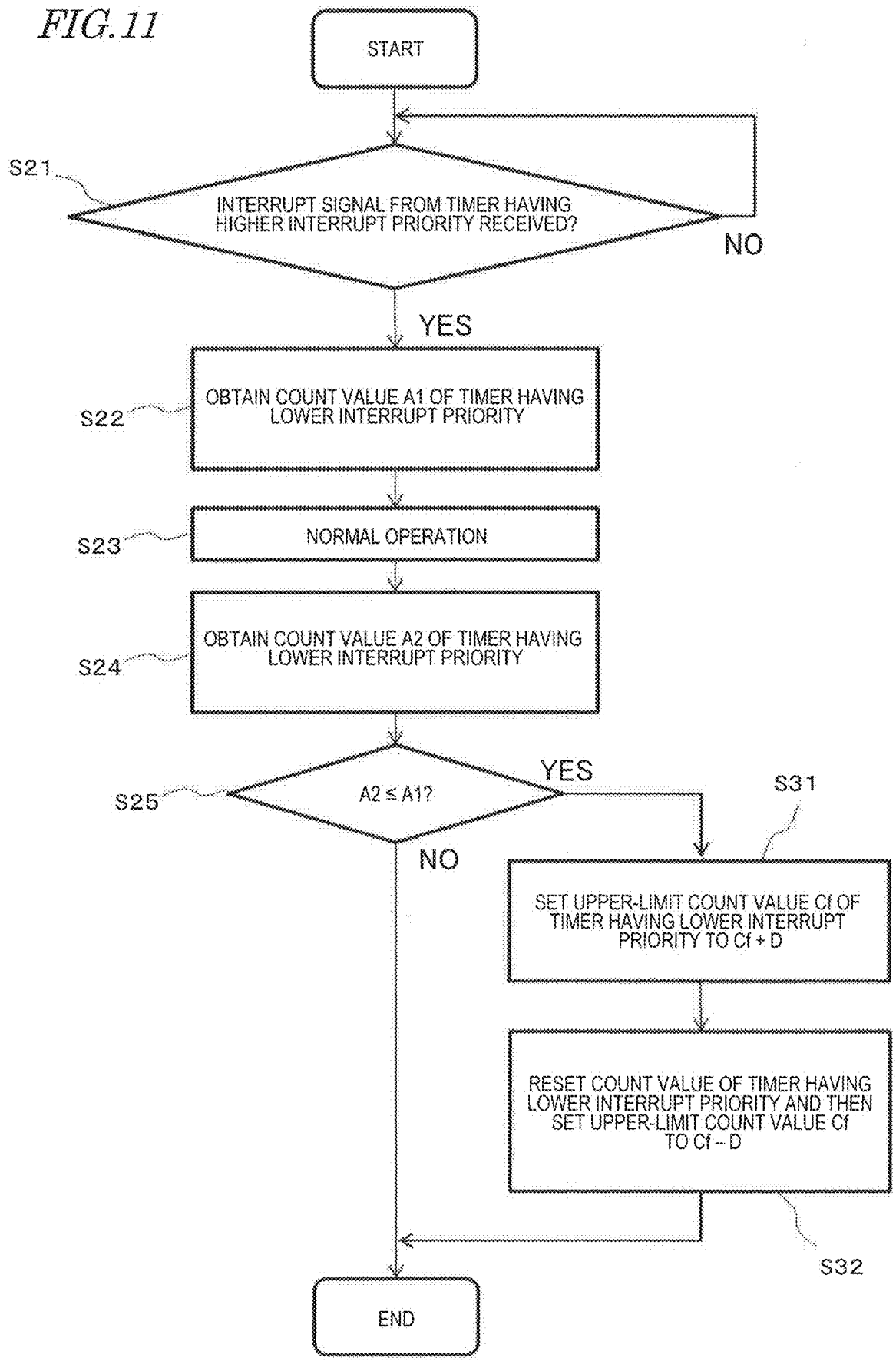
FIG. 11 is a flowchart showing steps involved in a task triggering timing adjustment process of a processor 10 according to a variation.

FIG. 11 is a flowchart showing steps involved in a task triggering timing adjustment process of the processor 10 according to the variation. FIG. 12 mainly shows a change amount in the counter value of the system timer 122 during execution of the process of FIG. 9.

Steps S21 to S25 of the process of FIG. 11 are the same as those of FIG. 9 and will not be described.

In step S31, the processor core 120 changes the upper-limit count value Cf of the system timer 122, having a lower interrupt priority, to a value that is reached, by counting, later by a count D than the current upper-limit count value Cf. The changed upper-limit count value Cf is expressed by Cfa+D, where the original upper-limit count value Cf is represented by Cfa. As a result, the system timer 122 overflows the count D later than when the upper-limit count value is the original value. In other words, the generation of an overflow interrupt signal by the system timer 122 can be delayed by a period of time corresponding to the count value D.

Figure 12:
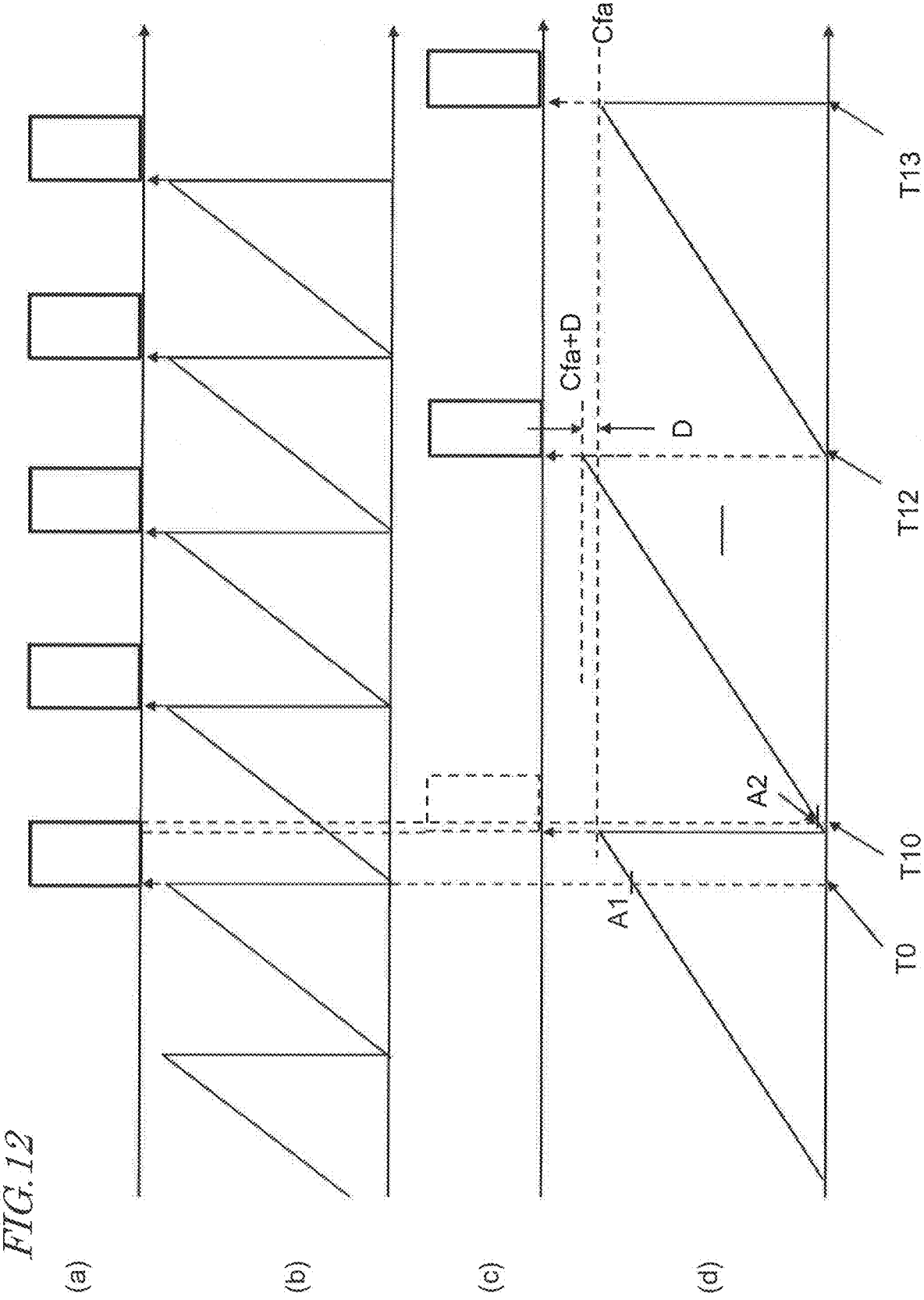
FIG. 12 is a diagram mainly showing a change amount in the counter value of the system timer 122 during execution of the process of FIG. 9.

FIG. 12(*d*) shows a situation that as a result of setting the upper-limit count value Cf to (Cfa+D), the system timer 122 generates an overflow interrupt signal at time T12 after the process of the motor control software application 20 is completed.

In step S32, the processor core 120 sets the upper-limit count value Cf (=Cfa+D) of the system timer 122 back to a value smaller by D after resetting the count value of the system timer 122. That is, the upper-limit count value Cf is set back to the upper-limit count value Cfa, which was taken before being changed in step S31. As a result, the system timer 122 after the upper-limit count value has been changed starts counting and overflows a period of time corresponding to the count value D later, compared to before the upper-limit count value has been changed. Thus, after a process of the motor control software application 20 is executed in response to an overflow interrupt signal of the hardware timer 123, the system timer 122 overflows, and a task of the real-time OS 30 can be executed.

Note that in the foregoing, it is assumed that the hardware timer 123 generates an overflow interrupt signal at 2 or 20 times as high a rate as that of the system timer 122, for example. However, these values are merely illustrative. The hardware timer 123 may change the count value at N times as high a frequency as that of the system timer 122 (N: a positive integer). To this end, the processor core 120 may cause the frequency divider 121 to input, to the hardware timer 123, a clock signal having N times as high a frequency as that of a clock signal input to the system timer 122. Note that N may be one. In this situation, the specifications of the hardware timer 123 take precedence, and therefore, the hardware timer 123 also overflows in less than 1 msec. In that case, the processor core 120 executes a task of the real-time OS 30 in response to an interrupt signal, once every N times an interrupt signal is generated by the system timer 122.

Alternatively, a change amount (an increment or decrement) in the count value of the hardware timer 123 may be set to N (N: a positive integer), and the count value may be changed, where a change amount in the count value of the system timer 122 is one.

In the foregoing, it is assumed that two pieces of software, i.e., the motor control software application 20 and the real-time OS 30, are operated, for example. However, other software applications having a control cycle shorter than that of the real-time OS 30 can additionally be operated simultaneously. In that case, a plurality of hardware timers 123 are used. The processor core 120 adjusts the initial count value or upper-limit count value of the system timer 122 such that a task of the real-time OS 30 is executed after the execution of all software applications is completed. For example, the processor core 120 may perform the above process to determine the initial count value or upper-limit count value of the system timer 122, based on the overflow timing and software application execution end time of each hardware timer 123, and select one of the initial count values or upper-limit count values that allows the execution timings of the software applications and the real-time OS 30 to avoid coinciding and overlapping with each other.

As a specific example, a motor control software application having an execution period of 50 μsec, a resolver reader software application having an execution period of 100 μsec, and the real-time OS 30, which operates at periodic intervals of 1 msec or longer and manages a plurality of tasks, can be operated without a delay of start due to pre-emption.

(Example Applications) Examples to which the above motor drive system is applied will now be described.

Figure 13:
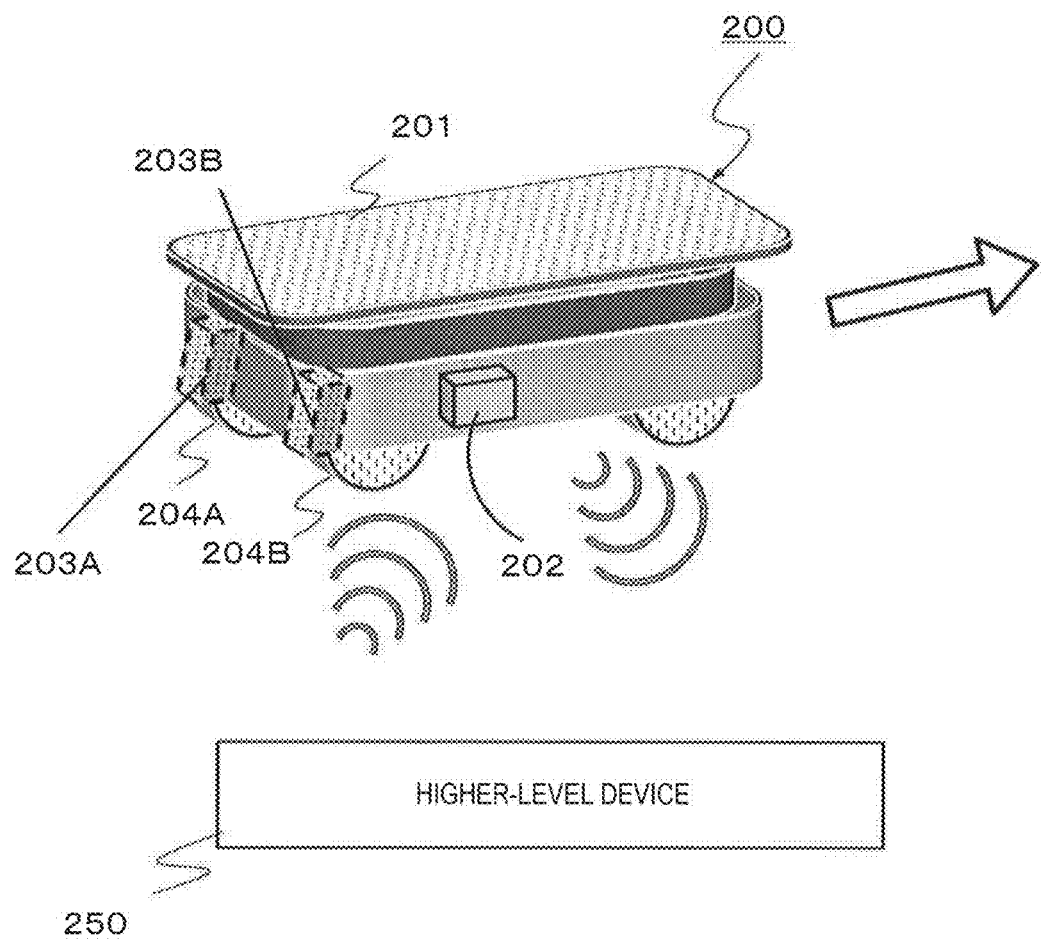
FIG. 13 is a diagram showing a configuration of a self-propelled robot 200.

FIG. 13 shows a configuration of a self-propelled robot 200. The self-propelled robot 200 has a transfer table 201, a system controller 202, motor drive systems 203A and 203B, and two driven wheels 204A and 204B.

The transfer table 201 is used for carrying an object to be transported.

The system controller 202 controls the direction and speed of movement of the self-propelled robot 200 according to instructions received wirelessly or by wire from a higher-level device 250. Specifically, the system controller 202 determines the speed and direction of rotation of each of the two driven wheels, i.e., the left wheel 204A and the right wheel 204B, and sends a control signal to the motor drive systems 203A and 203B.

The motor drive systems 203A and 203B separately control the speeds and directions of rotation of the driven wheels 204A and 204B, respectively, according to the control signal from the system controller 102.

Figure 14:
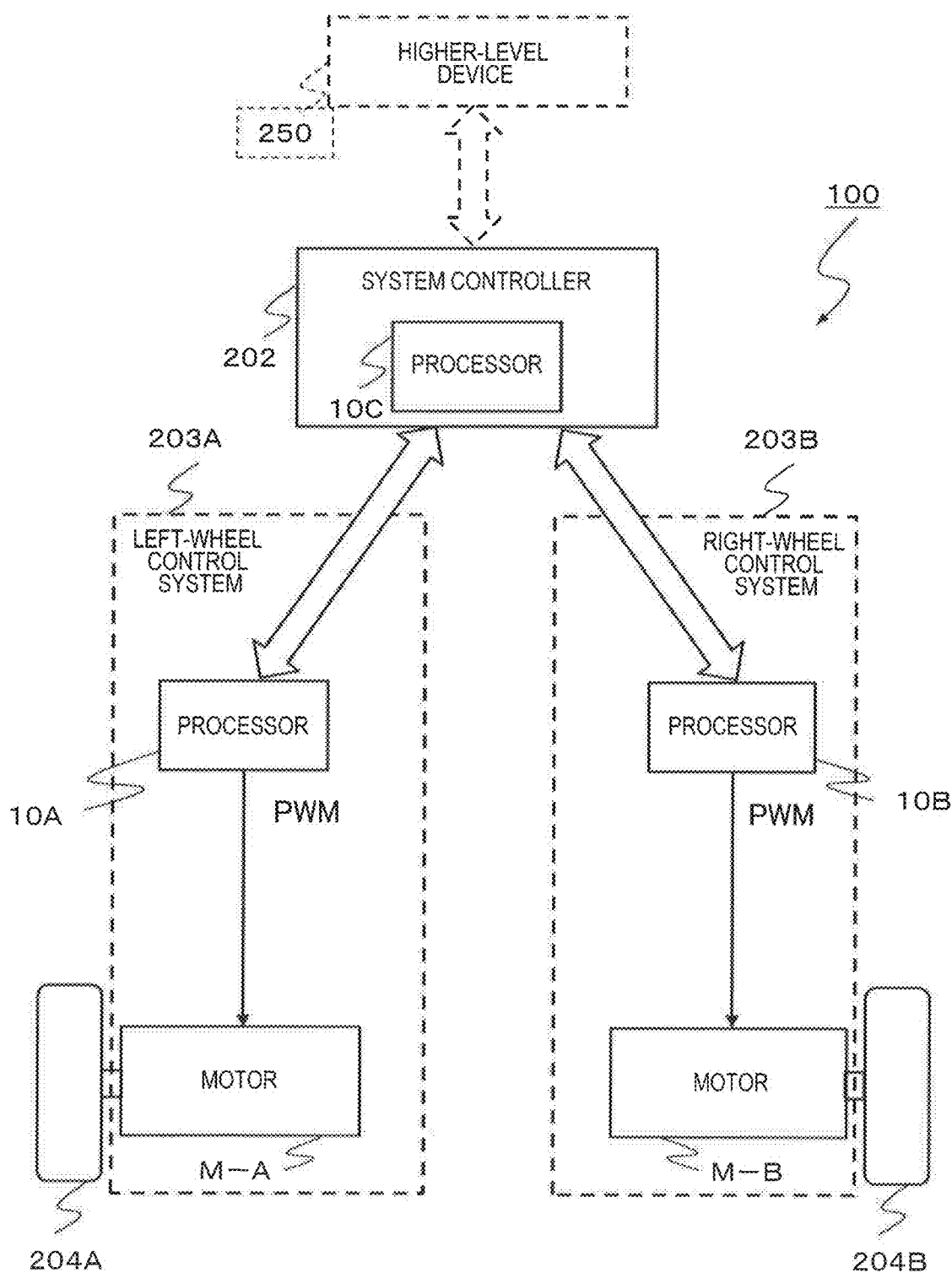
FIG. 14 is a diagram showing a hardware structure of the self-propelled robot 200.

FIG. 14 shows a hardware structure of the self-propelled robot 200. For the sake of clarity, the higher-level device 250, which is not included in the self-propelled robot 200, is indicated by a dashed line.

The system controller 202 has a processor 10C. The processor 10C has the hardware structure of FIG. 6. Therefore, the processor 10C will not be described in detail.

The motor drive system 203A has a processor 10A and a motor M-A. The motor drive system 203B has a processor 10B and a motor M-B. The motor drive systems 203A and 203B are each equivalent to the motor drive system 1 of FIG. 5. The system controller 202 outputs various control signals for controlling the drive of a motor, such as a control signal for triggering the rotation of a motor, a control signal for specifying the speed of rotation of a motor, and a control signal for stopping the rotation of a motor, to each of the motor drive systems 203A and 203B. The motor drive systems 203A and 203B each perform the above process according to the control signals from the system controller 202 to execute the motor control software application 20 and the real-time OS 30. The processor 10C of the system controller 202 may also execute the motor control software application and the real-time OS to perform the above synchronization process, or may execute other software applications having a higher control cycle than that of the real-time OS instead of the motor control software application.

Note that the processors 10A and 10B and the processor 10C do not necessarily need to be a product of the same model number of the same manufacturer. This is also true of the motors M-A and M-B. These components only need to have a function or performance required by the self-propelled robot 200. The motor drive systems 203A and 203B may also each be called an intelligent motor.

Note that the system controller 202 and the motor control systems 203A and 203B may be collectively referred to as a motor control system.

In the above example, it is assumed that the two rear wheels are a driven wheel. This is merely illustrative. For example, the present disclosure is also applicable to a two-wheel vehicle having a front and a rear wheel that are driven by separate motors, and a three-wheel and a four-wheel vehicle, etc., having a plurality of wheels driven by separate motors. Furthermore, the present disclosure is applicable to a motor control system in which the operation of a motor drive system having a single motor is controlled by a system controller.

According to the present disclosure, even when a plurality of control programs that have different periodic intervals and are independent of each other, are executed in parallel on the same processor, the executions of the control programs do not interfere with each other, and there is not a delay of start due to pre-emption. Programs are conventionally synchronized using a semaphore, etc. However, according to the present disclosure, the order of execution can be guaranteed without overhead, without the use of a semaphore.

In an illustrative motor drive system of the present disclosure, the processor core sets the count value D to a count value corresponding to a worst-case execution time of a motor control software application.

A first timer changes a count value, starting with a preset first initial value, after the count value reaches a first threshold. A second timer changes a count value, starting with a second initial value different from a preset initial count value, after the count value reaches a second threshold.

In the case where the second timer increments the count value according to a clock signal, if a count value A2 of the second timer at the end of execution of the motor control software application is smaller than or equal to a count value A1 of the second timer at the start of the execution of the motor control software application, the processor core detects that a second interrupt signal has been generated during the execution of the motor control software application.

In the case where the second timer decrements the count value according to a clock signal, if the count value A2 of the second timer at the end of execution of the motor control software application is greater than or equal to the count value A1 of the second timer at the start of the execution of the motor control software application, the processor core detects that the second interrupt signal has been generated during the execution of the motor control software application.

When the second interrupt signal is generated, the processor core executes the motor control software application with higher priority even during execution of a task of the operating system.

In the case where the first timer changes the count value at the same frequency as that of the second timer, a change amount (an increment or decrement) in the count value of the first timer is N times as great as a change amount in the count value of the second timer.

In the case where the first timer changes the count value at the same frequency as that of the second timer, the processor core executes a task of the operating system in response to the second interrupt signal once every N times the second interrupt signal is generated.

The first timer receives a clock signal having a frequency which is N times as high as that of the clock signal received by the second timer.

The illustrative motor drive system of the present disclosure is useful when a control software application having a relatively short control cycle, and an OS that generates a system timer interrupt at relatively long time intervals to execute a task, are operated on the same processor.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A motor drive system comprising:
    a motor;
    an oscillation circuit to output a clock signal; and
    a processor to operate according to the clock signal to control the motor,
    wherein
    the processor includes
        a first timer to change a count value, starting with a set first initial count value, and output a first interrupt signal at a time when the count value reaches a first threshold,
        a second timer to change a count value, starting with a set second initial count value, and output a second interrupt signal at a time when the count value reaches a second threshold, and a processor core to switch between a motor control software application for controlling the motor and an operating system, and execute the motor control software application or the operating system, in response to the first interrupt signal and the second interrupt signal, the first timer changes, according to the clock signal, the count value at the same frequency as that of the second timer or at N times as high a frequency as that of the second timer, where N is an integer of two or more, the processor core executes the motor control software application in response to the first interrupt signal, and a task of the operating system in response to the second interrupt signal, when the second interrupt signal is generated during execution of the motor control software application, the processor core sets the initial count value of the second timer to a value that would be reached, by counting, earlier by a count value D than the second threshold, or sets the second threshold to a value that allows counting to be prolonged by the count value D compared to the second threshold, and the count value D is greater than or equal to a count value corresponding to a difference between time Ta at which the second interrupt signal is generated and time Tb at which a process of the motor control software application is completed.

2. The motor drive system of claim 1, wherein the processor core sets a count value corresponding to a worst-case execution time of the motor control software application as the count value D.

3. The motor drive system of claim 1, wherein the first timer changes the count value, starting with a preset first initial value, after the count value reaches the first threshold, and the second timer changes the count value, starting with a preset second initial value different from the preset initial count value, after the count value reaches the second threshold.

4. The motor drive system of claim 1, wherein in a case where the second timer increments the count value according to the clock signal, if a count value A2 of the second timer at the end of execution of the motor control software application is smaller than or equal to a count value A1 of the second timer at the start of the execution of the motor control software application, the processor core detects that the second interrupt signal has been generated during the execution of the motor control software application.

5. The motor drive system of claim 1, wherein in a case where the second timer decrements the count value according to the clock signal, if a count value A2 of the second timer at the end of execution of the motor control software application is greater than or equal to a count value A1 of the second timer at the start of the execution of the motor control software application, the processor core detects that the second interrupt signal has been generated during the execution of the motor control software application.

6. The motor drive system of claim 1, wherein when the first interrupt signal is generated, the processor core executes the motor control software application with higher priority even during execution of a task of the operating system.

7. The motor drive system of claim 1, wherein in a case where the first timer changes the count value at the same frequency as that of the second timer, a change amount in the count value of the first timer is N times as great as a change amount in the count value of the second timer.

8. The motor drive system of claim 1, wherein in a case where the first timer changes the count value at the same frequency as that of the second timer, the processor core executes a task of the operating system in response to the second interrupt signal once every N times the second interrupt signal is generated.

9. The motor drive system of claim 1, wherein the first timer receives a clock signal having a frequency which is N times as high as that of the clock signal received by the second timer.

10. A motor control system comprising:
the motor drive system of claim 1; and
a system controller to output a control signal for controlling drive of the motor of the motor drive system.

11. A self-propelled robot comprising:
the motor control system of claim 10;
a plurality of wheels, one or more of the plurality of wheels being driven by the motor; and
a transfer table to place an object on.

\* \* \* \* \*